(12) United States Patent
Mountz et al.

(10) Patent No.: US 9,389,609 B1
(45) Date of Patent: Jul. 12, 2016

(54) CONTAINER HOLDER UTILIZATION AND SELECTION

(71) Applicant: Amazon Technologies, Inc., Seattle, WA (US)

(72) Inventors: Michael Cordell Mountz, Lexington, MA (US); Peter R. Wurman, Acton, MA (US); John Joseph Enright, Somerville, MA (US); Jeremiah David Brazeau, Hudson, NH (US); Michael Harrison Decker, Concord, MA (US); Gavin Cotter, Cambridge, MA (US); Ishan Mukherjee, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/503,023

(22) Filed: Sep. 30, 2014

(51) Int. Cl.
*G06Q 10/08* (2012.01)
*G05B 19/418* (2006.01)
*G06Q 10/00* (2012.01)

(52) U.S. Cl.
CPC .......... *G05B 19/41895* (2013.01); *G06Q 10/00* (2013.01); *G06Q 10/087* (2013.01); *G05B 2219/31319* (2013.01)

(58) Field of Classification Search
CPC ................ G05B 19/41895; G05B 2219/31319
See application file for complete search history.

(56) References Cited

U.S. PATENT DOCUMENTS

| | | | | |
|---|---|---|---|---|
| 7,894,933 B2* | 2/2011 | Mountz | ................ | G06Q 10/087 700/214 |
| 7,894,939 B2* | 2/2011 | Zini | ................ | G05B 19/41895 700/245 |
| 7,912,574 B2* | 3/2011 | Wurman | ............ | G05B 19/4189 340/572.1 |
| 8,220,710 B2* | 7/2012 | Hoffman | ............... | G06Q 10/087 235/375 |
| 8,280,547 B2 | 10/2012 | D'Andrea et al. | | |
| 8,483,869 B2* | 7/2013 | Wurman | ............... | B65G 1/1378 414/807 |
| 8,626,335 B2* | 1/2014 | Wurman | ............... | B65G 1/1378 235/385 |
| 8,886,390 B2* | 11/2014 | Wolfe | ..................... | G06F 17/00 700/245 |
| 8,892,241 B2* | 11/2014 | Weiss | ..................... | B66F 9/063 700/213 |
| 8,965,562 B1* | 2/2015 | Wurman | ............... | G06Q 10/087 235/385 |
| 8,983,647 B1* | 3/2015 | Dwarakanath | ....... | G06Q 10/087 700/216 |
| 9,008,827 B1* | 4/2015 | Dwarakanath | ....... | G06Q 10/087 700/213 |
| 9,008,828 B2* | 4/2015 | Worsley | ............... | G06Q 10/087 700/213 |
| 9,111,251 B1* | 8/2015 | Brazeau | ............... | G06Q 10/087 |
| 2012/0143427 A1 | 6/2012 | Hoffman et al. | | |

* cited by examiner

*Primary Examiner* — Thomas Randazzo
(74) *Attorney, Agent, or Firm* — Kilpatrick Townsend & Stockton LLP

(57) ABSTRACT

An inventory system includes inventory holders, container holders, containers carried by the container holders, mobile drive units, stations, and a management module. The management module instructs the mobile drive units to move the inventory holders and container holders to stations. Container holders are loaded with containers of inbound inventory items at a first station. Inbound inventory items are transferred from containers to inventory holders at a second station. Outbound inventory items are transferred from inventory holders to containers at a third station. Containers of outbound inventory items are removed from container holders at a fourth station.

20 Claims, 7 Drawing Sheets

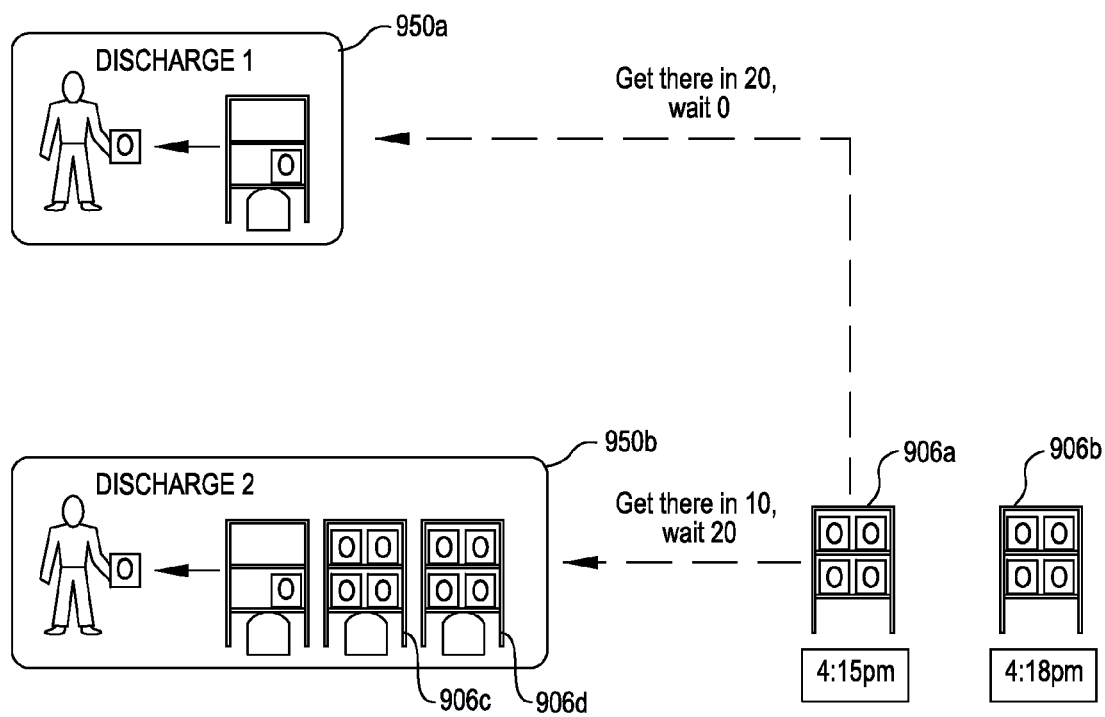

CONTAINER HOLDER UTILIZATION AND SELECTION

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 12 illustrates an example scenario of determining an allocation of container holders to discharge stations according to a particular embodiment.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to management of reusable containers that are used for transporting inventory items in an inventory system, as well as techniques related to selection, organization, and management of components associated with operations involving the containers.

For example, in accordance with an embodiment, a reusable container containing incoming inventory items, such as items from a supplier, is placed on a portable rack at a first location to introduce the filled container into the inventory system. In accordance with instructions from the system, a mobile drive unit moves the portable rack, with the filled container thereon, to a second location, where the incoming inventory items are removed from the container and placed or stowed into inventory holders, such as for storage in the inventory system, leaving the empty container on the portable rack. The mobile drive unit then moves the portable rack, with the empty container thereon, to a third location where items from inventory holders are selected or picked in accordance with instructions from the system, and placed in the empty container to load the container with outgoing inventory items, such as to fulfill customer orders. The mobile drive unit then moves the portable rack, with the loaded container thereon, to a fourth location, and the container loaded with outgoing inventory items is removed from the portable rack and discharged from the inventory system (e.g., sent out to customers for delivery). The portable rack, now empty, returns to the first location (or another container introduction location) to receive more incoming containers and begin the process anew. Multiple portable racks and inventory holders are utilized in the system, and a management module makes determinations and issues instructions as to which portable rack and/or inventory holder is/are to be moved at any particular time to any particular location to facilitate any of the described operations.

Figure 1:
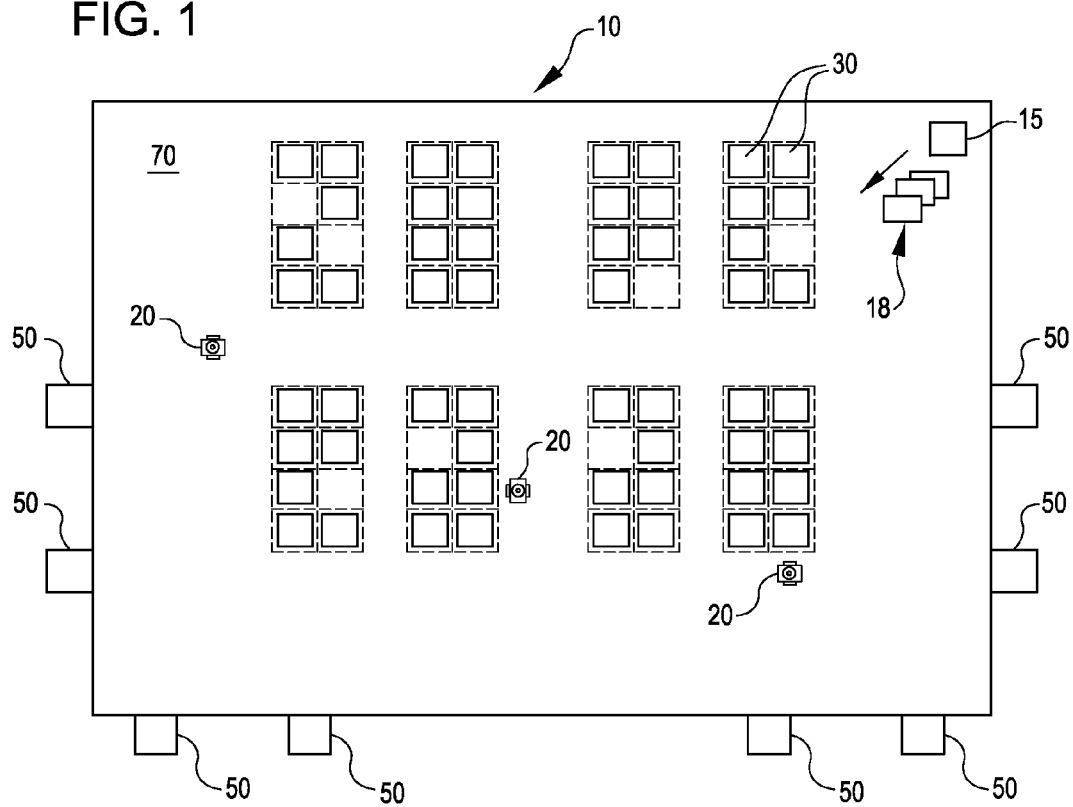
FIG. 1 illustrates components of an inventory system according to a particular embodiment.

Referring now to the figures, in which like reference numerals may represent like parts, FIG. 1 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 1 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 2.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 3 and 4.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20.

In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 1 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 1 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 2:
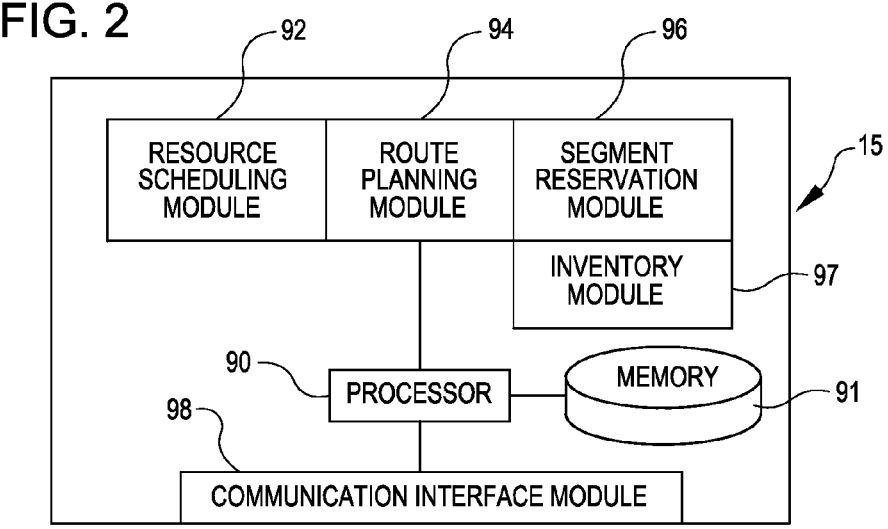
FIG. 2 illustrates in greater detail the components of an example management module that may be utilized in particular embodiments of the inventory system shown in FIG. 1.

FIG. 2 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or non-volatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 3:
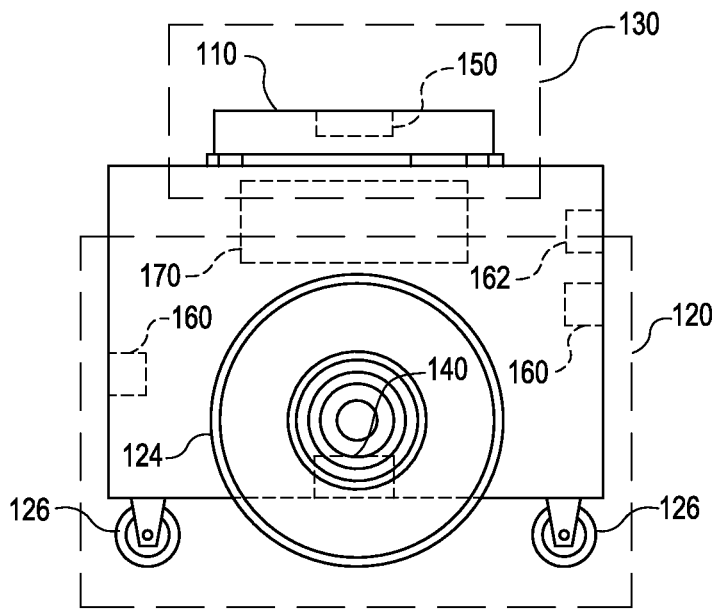
FIGS. 3 and 4 illustrate in greater detail an example mobile drive unit that may be utilized in particular embodiments of the inventory system shown in FIG. 1.
Figure 4:
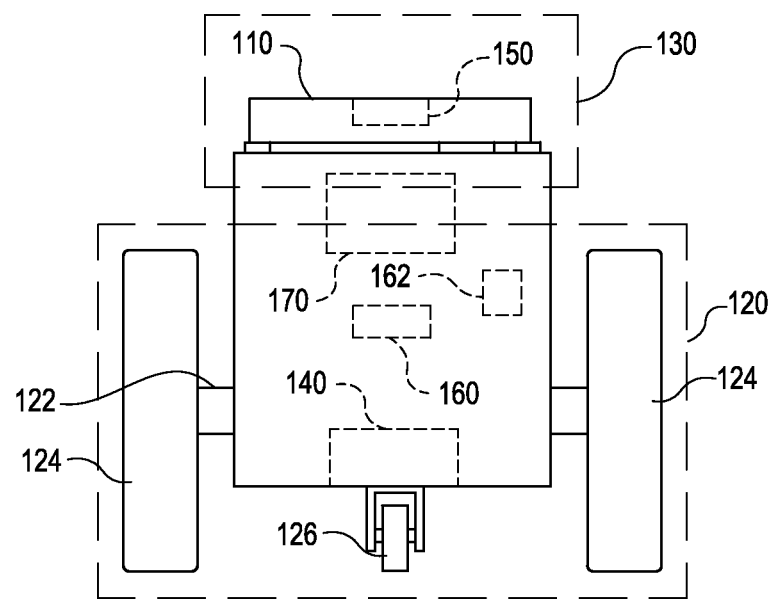

FIGS. 3 and 4 illustrate in greater detail the components of a particular embodiment of mobile drive unit 20. In particular, FIGS. 3 and 4 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel drive module 120. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speed from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 3 and 4 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 5:
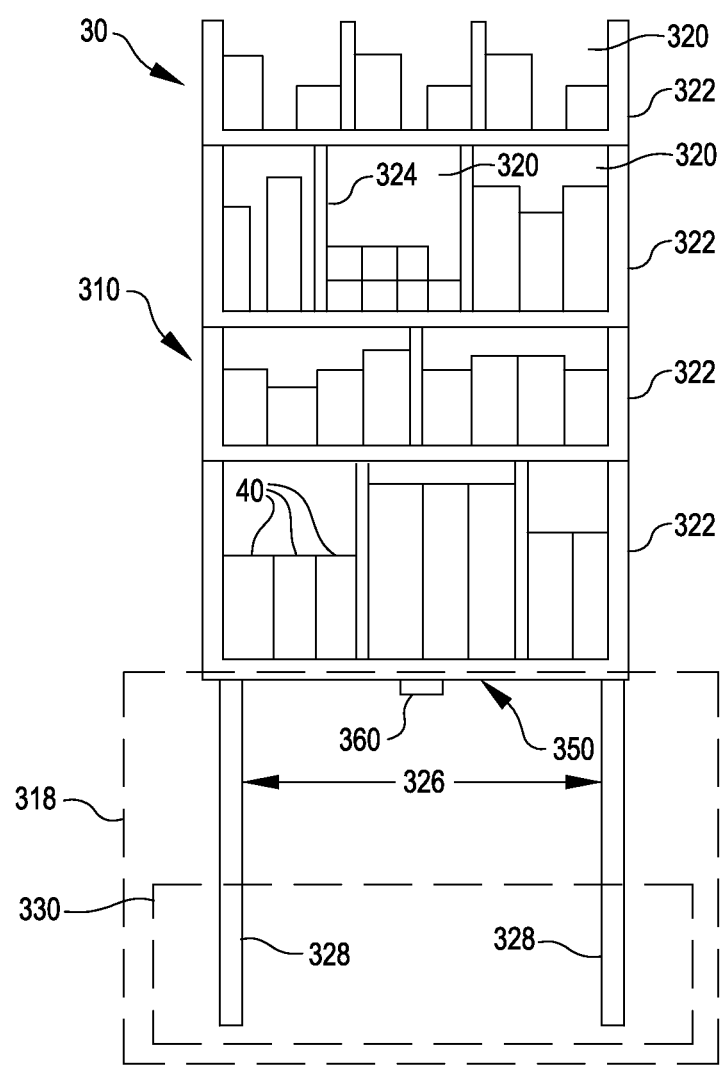
FIG. 5 illustrates in greater detail an example inventory holder that may be utilized in particular embodiments of the inventory system shown in FIG. 1.

FIG. 5 illustrates in greater detail the components of a particular embodiment of inventory holder 30. In particular, FIG. 5 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to management of reusable containers that are used for transporting inventory items in an inventory system, as well as techniques related to selection, organization, and management of components associated with operations involving the containers.

Figure 6:
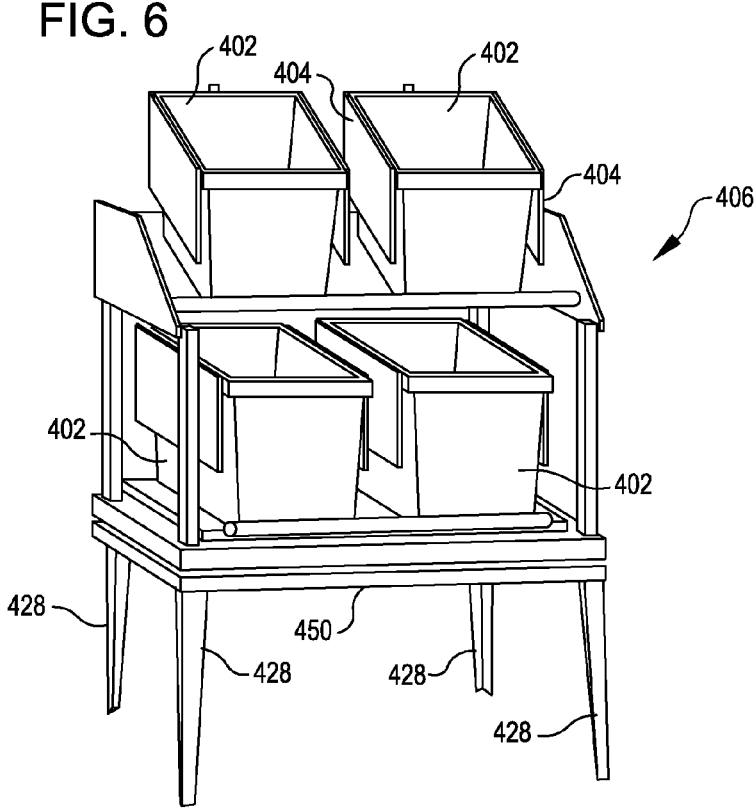
FIG. 6 illustrates an example of reusable containers and an associated container holder according to a particular embodiment.

FIG. 6 illustrates a particular embodiment of reusable containers 402 (individually, a container 402) and an associated container holder 406. Each container 402 may be a container used to transport inventory items 40 independently of inventory holders 30. Containers 402 may all be the same structure, or may have different structures. For ease of description, however, some embodiments herein describe a single container 402, but the system is typically implemented with multiple containers, which may be the same or different in size and/or design from one another. In an example, the container 402 can be a container in which inventory items 40 are initially delivered to an inventory system 10. In a particular embodiment, the container 402 is a box constructed of durable material (such as plastic) and includes one or more flaps 404 that can be rotated upon hinges to close a top of the box. In some embodiments, at least some containers 402 include flexible material (such as cloth), lack tops, or otherwise differ in size, shape, or other characteristics from the container 402 depicted in FIG. 6. In a particular embodiment, the containers 402 are constructed in a standardized size or set of sizes, which can accommodate individual or groups of inventory items 40 of differing sizes.

The container holder 406 carries containers 402 and may be sized to carry multiple containers 402 and/or containers 402 of different sizes. For example, the container holder 406 may include one or more berths, e.g., shelves, slots, or other storage spaces, each sized to carry one or more containers 402. The container holder 406 permits containers 402 to be easily loaded or removed from the container holder 406 by human or automated operators. In a particular embodiment, the container holder 406 may be an inventory holder 30 configured to carry the container 402. For example, the container holder 406 may have various features similar to the inventory holder 30 as described above with respect to FIG. 5, such as legs 428 and a docking surface 450 by which mobile drive units can dock with the container holder 406.

Figure 7:
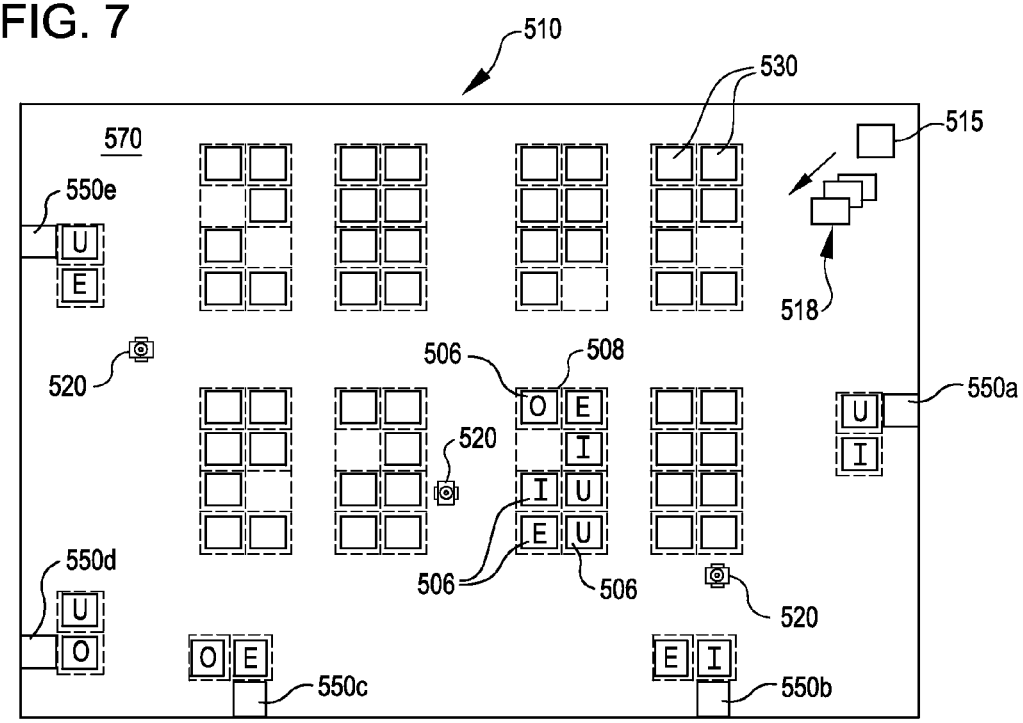
FIG. 7 illustrates an inventory system that includes container holders according to a particular embodiment.

FIG. 7 illustrates an inventory system 510 that includes container holders 506 according to a particular embodiment. The inventory system 510 includes management module 515, one or more mobile drive units 520, one or more inventory holders 530, and one or more inventory stations 550. All of these components can provide the same functionality as previously described with respect to other components of the same name and similar reference numbers and furthermore may provide additional functionality related to the container holders 506. For example, whereas the mobile drive units 520 may transport inventory holders 530 between points within a workspace 70 in response to commands communicated by management module 15, the mobile drive units 520 may likewise transport container holders 506. As another example, tasks designated for completion at inventory stations 550 may involve either or both of inventory holders 530 or container holders 506.

The inventory system 510 includes container holders 506 in a variety of states. For example, an "empty" subset of container holders 506 (denoted by the letter "E" in FIG. 7) can carry empty containers 402 that do not currently contain any inventory items 40. An "inbound" subset of container holders 506 (denoted by the letter "I" in FIG. 7) can carry containers 402 with inbound inventory items 40, e.g., inventory items received into the inventory system 510 from merchants or vendors, while an "outbound" subset of container holders 506 (denoted by the letter "O" in FIG. 7) can carry containers 402 with outbound inventory items 40, e.g., inventory items to be sent outside the inventory system 510 to fulfill customer orders or to other facilities. An "unoccupied" subset of container holders 506 (denoted by the letter "U" in FIG. 7) can be at least partially vacant and unoccupied by containers 402. States may apply to an entire container holder 506 or may refer to a condition of an individual berth of a container holder 506. As such, a particular container holder 506 may simultaneously be in multiple states or subsets as a result of different berths of the container holder 506 being in differing states.

As described in greater detail below with respect to FIG. 8, tasks may be performed at a number of types of stations 550 to cause container holders 506 (or particular berths thereof) to change state. Types of stations 550 shown in FIG. 7 include induct stations 550a, stow stations 550b, pick stations 550c, discharge stations 550d, and adjustment stations 550e. In some embodiments, a particular station 550 can function as multiple types of stations at once and/or be switched between types. In some embodiments, the management module 515 can assign a particular station 550 to change from one type to another based on fluctuating need for different tasks to be performed. The workspace 570 can also include one or more storage spaces 508 in which container holders 506 can be stored, such as when a station 550 is not immediately available for a next task associated with the container holder 506. In some embodiments, particular storage spaces 508 may be specifically designated for container holders 506 or container holders 506 in a particular state. Particular storage spaces 508 in some embodiments are part of a mixed storage area equally available to container holders 506, regardless of state, and/or inventory holders 530.

Figure 8:
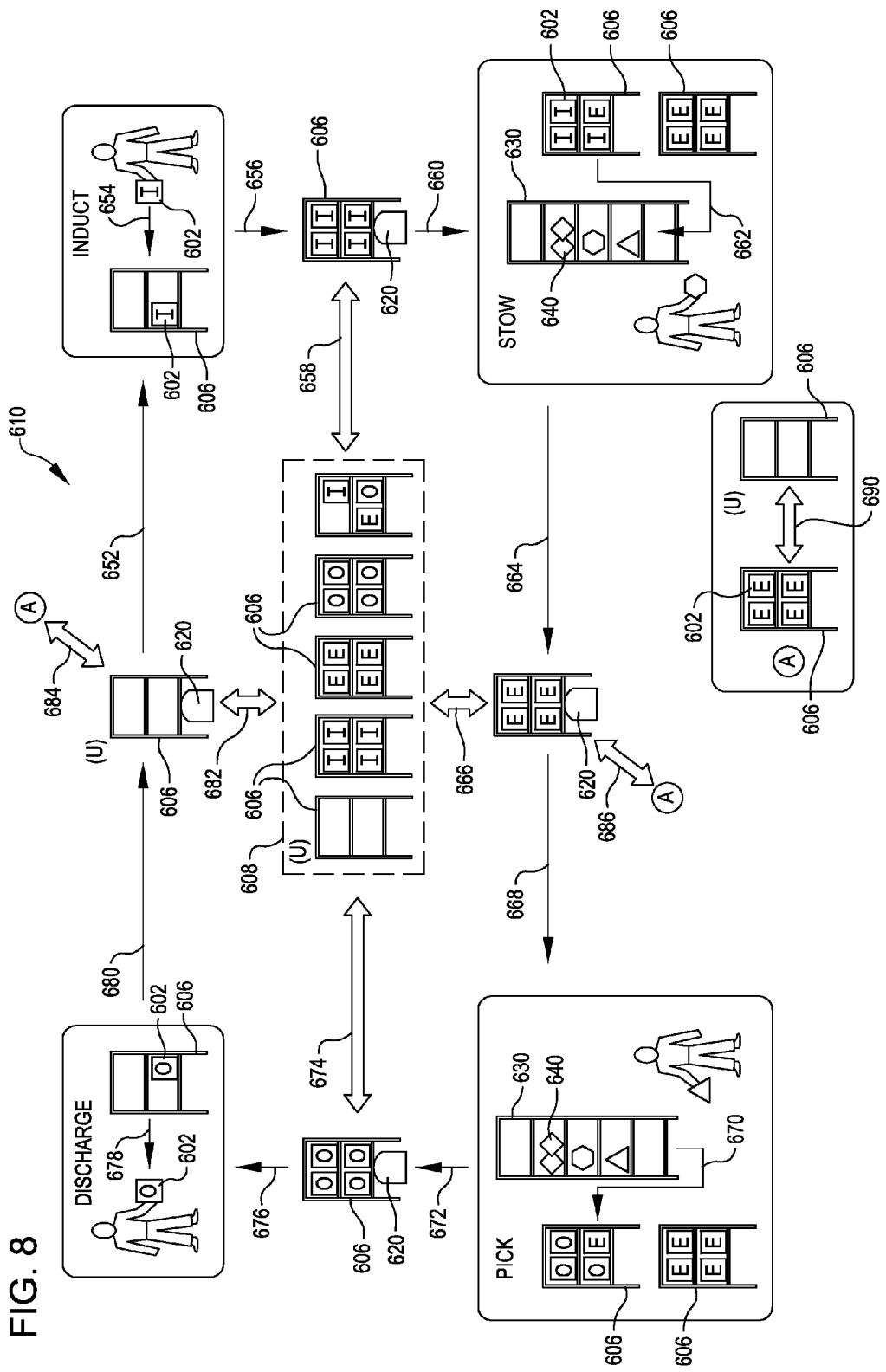
FIG. 8 is a flow chart illustrating management of container holders in use in an inventory system according to a particular embodiment.

FIG. 8 is a flow chart illustrating management of container holders 606 in use in an inventory system 610 according to a particular embodiment. Management of the container holders 606 is facilitated by the management module 515. To this end, the management module 515 provides instructions to various components of the inventory system 510, such as instructing the movements of the mobile drive units 620 described below and providing instructions for automated or human operators at stations 550. For example, the management module 515 may provide instructions to human operators via audible instructions, visible instructions on a display, light shined on a feature to be interacted with during an instructed task, or some other indicator. At 652, a container holder 606 in a U-state (i.e., in which at least one berth is unoccupied by, and carrying zero, containers 602) can be moved to an induct station, such as the induct station 550a shown in FIG. 7. For example, the container holder 606 can be moved by a mobile drive unit 620 that is the same as—or different from—any mobile drive unit 620 used for any subsequent moves of the container holder 606. At 654, a human or automated operator at the induct station, in response to instructions from the management module 515, can load the container holder 606 with containers 602 containing inbound inventory items. For example, containers 602 delivered to the induct station via conveyers, carts, or other container holders 606 from other inventory systems may contain items for replenishing a stock of inventory items 640 stored in the inventory system 610. Loading the container holder 606 with containers 602 containing inbound inventory items 640 can change, set, and/or convert the container holder 606 (or a particular berth thereof) from a U-state to an I-state (i.e., in which at least one berth is carrying one or more containers 602 containing inbound inventory items), thus ensuring that the container holder 606 will be included in the "inbound" subset. For example, as shown in FIG. 7, U-state container holders arriving to the induct station 550a can depart as I-state container holders.

At 656 in FIG. 8, the I-state container holder 606 can be moved away from the induct station, such as by a mobile drive unit 620. At 658, the I-state container holder 606 can be moved to and/or from storage 608, for example, if a station is not immediately available for the I-state container holder 606. As will be appreciated from the drawings and subsequent description, in some embodiments, the storage area 608 may be utilized for container holders 606 in any state, including container holders 606 with berths in different states (such as the container holder 606 that is depicted in FIG. 8 at the extreme right of the storage area 608).

At 660, the I-state container holder 606 can be moved, from either the induct station or storage 608, to an available stow station, such as the stow station 550b shown in FIG. 7. At 662, a human or automated operator at the stow station can transfer the inbound inventory items 640 from the containers 602 carried by the container holder 606 to a first set of inventory holders 630 moved to the stow station. The inventory items 640 inbound to the inventory holders 630 may thus replenish a stock stored in the inventory system 610. Transferring the inbound inventory items 640 from the containers 602 to the inventory holders 630 can empty the containers 602. Emptying the containers 602 can change, set, and/or convert the container holder 606 (or a particular berth thereof) from an I-state to an E-state (i.e., in which at least one berth is carrying one or more empty containers 602), thus ensuring that the container holder 606 will be included in the "empty" subset. For example, as shown in FIG. 7, I-state container holders arriving to the stow station 550b can depart as E-state container holders.

At 664 in FIG. 8, the E-state container holder 606 can be moved away from the stow station, such as by a mobile drive unit 620. At 666, the E-state container holder 606 can be moved to and/or from storage 608, for example, if a station is not immediately available for the E-state container holder 606.

At 668, the E-state container holder 606 can be moved, from either the stow station or storage 608, to an available pick station, such as the pick station 550c shown in FIG. 7. At 670, a human or automated operator at the pick station can transfer outbound inventory items 640 into the empty containers 602 carried by the container holder 606. The outbound inventory items 640 can be transferred from a second set of inventory holders 630 moved to the pick station. A set of inventory items 640 outbound from the inventory holders 630 may thus be acquired and grouped for subsequent tasks facilitated by the inventory system 610. Transferring the outbound inventory items 640 from the inventory holders 630 to the containers 602 can change, set, and/or convert the container holder 606 (or a particular berth thereof) from an E-state to an O-state (i.e., in which at least one berth is carrying one or more containers 602 containing outbound inventory items), thus ensuring that the container holder 606 will be included in the "outbound" subset. For example, as shown in FIG. 7, E-state container holders arriving to the pick station 550c can depart as O-state container holders.

At 672 in FIG. 8, the O-state container holder 606 can be moved away from the pick station, such as by a mobile drive unit 620. At 674, the O-state container holder 606 can be moved to and/or from storage 608, for example, if a station is not immediately available for the O-state container holder 606.

At 676, the O-state container holder 606 can be moved, from either the pick station or storage 608, to an available discharge station, such as the discharge station 550d shown in FIG. 7. At 678, a human or automated operator at the discharge station can unload outbound inventory items 640 from the containers 602 (and/or entire containers 602 containing outbound inventory items 640) from the container holder 606. For example, the containers 602 of outbound inventory items can be transferred to conveyers, carts, or other container holders 606 from other inventory systems to discharge the containers 602 and associated contents from the inventory system 610. Unloading the containers 602 of outbound inventory items 640 from the container holder 606 can change, set, and/or convert the container holder 606 (or a particular berth thereof) from an O-state to the U-state (i.e., back to the state in which at least one berth is unoccupied by containers 602), thus ensuring that the container holder 606 will be included in the "unoccupied" subset. For example, as shown in FIG. 7, O-state container holders arriving to the discharge station 550d can depart as U-state container holders.

At 680 in FIG. 8, the U-state container holder 606 can be moved away from the discharge station, such as by a mobile drive unit 620. At 682, the U-state container holder 606 can be moved to and/or from storage 608, for example, if a station is not immediately available for the U-state container holder 606. The U-state container holder 606, as previously described, at 652, can be moved, from either the discharge station or storage 608, to an induct station, such as the induct station 550a shown in FIG. 7.

In some embodiments, introducing or removing extra empty containers 602 may be desirable. As an illustrative example, inbound containers 602 may contain a lower average number of inventory items 40 than outbound containers 602 such that emptied containers 602 are generated faster than consumed. On the other hand, if inbound containers 602 contain a higher average number of inventory items 40 than outbound containers 602, the demand for emptied containers 602 may exceed the supply. As a further illustrative example, a delay in transferring inbound inventory items 640 out of containers 602 at a pick station (as at 662) may result in a shortage of empty containers 602 for filling with outbound inventory items 640 at a stow station (as at 670). On the other hand, a delay in unloading containers 602 at a discharge station (as at 678) may result in a shortage of U-state container holders 606 for loading containers 602 of inbound inventory items 640 at an induct station (as at 654). To this end, in some embodiments, empty containers 602 can be added to and/or removed from a container holder 606 (as at 690) at an adjusting station to switch the container holder 606 (or a particular berth thereof) between the U-state and the E-state. In some embodiments, a U-state container holder 606 can be moved (as at 684) to an adjusting station, loaded with empty containers 602 (as at 690), and transported as an E-state container holder 606 to storage (as at 686 and 666) or to a pick station (as at 686 and 668). Similarly, an E-state container holder 606 can be moved (as at 686) to an adjusting station, unloaded of empty containers 602 (as at 690), and transported as a U-state container holder 606 to storage (as at 684 and 682) or to an induct station (as at 684 and 652). As may be appreciated with respect to FIG. 7. U-state container holders arriving to the adjustment station 550e can depart as E-state container holders, and E-state container holders 606 arriving to the adjustment station 550e can depart as U-state container holders 606. In some embodiments, empty containers 602 can be directly added to a U-state container holder 606 at another station 550, such as an induct station 550a or any other station. Empty containers 602 in some embodiments can be removed from an E-state container holder 606 at another station 550, such as a discharge station 550d or any other station.

In some embodiments, moving inventory items 640 directly between containers 602 may be desirable. For example, at the stow station at 662, rather than transferring inbound inventory items 640 to a first set of inventory holders 630, the inbound inventory items 640 may be transferred to other containers 602 carried by the same or a different container holder 606. As another example, at the pick station at 670, rather than transferring outbound inventory items 640 to a second set of inventory holders 630, the outbound inventory items 640 may be transferred to other containers 602 carried by the same or a different container holder 606. Transferring inventory items between containers 602 may permit inventory items 40 to be consolidated organized, or distributed as desired.

Figure 9:
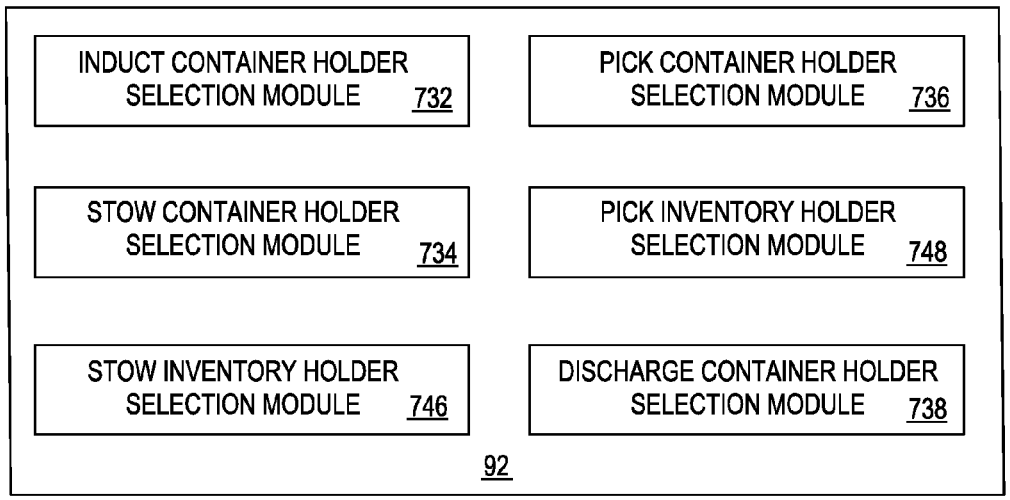
FIG. 9 illustrates in greater detail some components that may be utilized in particular embodiments of the resource scheduling module shown in FIG. 2.

FIG. 9 illustrates in greater detail some components that may be utilized in particular embodiments of the resource scheduling module 92 shown in FIG. 2. For example, the resource scheduling module 92 may include an induct container holder selection module 732, a stow container holder selection module 734, a stow inventory holder selection module 746, a pick container holder selection module 736, a pick inventory holder selection module 748, and a discharge container holder selection module 738. The induct container holder selection module 732 can select the particular container holder 606 to be moved to an induct station to facilitate an inducting operation such as 654. The stow container holder selection module 734 can select a particular container holder 606 to be moved to a stow station to facilitate a stowing operation such as 662, while the stow inventory holder selection module 746 can select a particular inventory holder 630 to be moved to the stow station to facilitate the stowing operation. The pick container holder selection module 736 can select a particular container holder 606 to be moved to a pick station to facilitate a pick operation such as 670, while the pick inventory holder selection module 748 can select a particular inventory holder 630 to be moved to the pick station to facilitate the pick operation. The discharge container holder selection module 738 can select a particular container holder 606 to be moved to a discharge station to facilitate a discharge operation such as 678.

Although particular examples of selection criteria may be described herein within the context of a use by a particular selection module described with respect to FIG. 9, any selection criteria described herein may alternatively or additionally be utilized by any of such selection modules. In some embodiments, for an induct operation (such as at 654 shown in FIG. 8), the induct container holder selection module 732 selects a U-style container holder 606 based on proximity. For example, the U-style container holder 606 nearest to an induct station may be selected. However, the induct container holder selection module 732 may additionally or alternatively utilize other criteria in the selection process, such as the utility of the storage space 608 occupied by the U-state container holder 606 for other container holders 606 and/or inventory holders 630.

In some embodiments, for a stow operation (such as at 662 shown in FIG. 8) the stow container holder selection module 734 selects a container holder 606 based on a duration factor. For example, the stow container holder selection module 734 may select the I-state container holder 606 that is carrying the oldest inbound containers 602 (i.e., the containers 602 that were inducted longest ago).

In some embodiments, for the same stow operation (e.g., at 662 shown in FIG. 8), the stow inventory holder selection module 746 selects an inventory holder 630 to move to the stow station based on distance and/or fitness of the inventory holder 630 for the inbound inventory items 640. For example, the stow inventory holder selection module 746 may evaluate whether a particular inventory holder 630 contains adequate space for storing inbound inventory items 640 contained in the inbound containers 602 carried by the container holder 606 selected by the stow container holder selection module 734. The stow inventory holder selection module 746 may select the nearest such suitable inventory holder 630.

In some embodiments, for a pick operation (such as at 670 shown in FIG. 8), the pick container holder selection module 736 selects the container holder 606 based on proximity. For example, the E-style container holder 606 nearest to a pick station may be selected.

In some embodiments, for the same pick operation (e.g., at 670 shown in FIG. 8) the pick inventory holder selection module 748 selects a particular inventory holder 630 to be moved to the pick station. This selection may be based on requests or orders for outbound inventory items 640 that are being fulfilled at the pick station. The pick inventory holder selection module 748, in some embodiments, selects a particular inventory holder 630 carrying a requested inventory item 640 based on proximity of the particular inventory holder 630 to the pick station. In some embodiments, the pick inventory holder selection module 748 selects a particular inventory holder 630 based on the anticipated destination of outbound containers 602 on a container holder 606 at the pick station. Illustrative examples of such destination-based selections are illustrated in FIGS. 10-11, and example selections by the discharge container holder selection module 738 are described below, such as with respect to FIG. 12.

Figure 10:
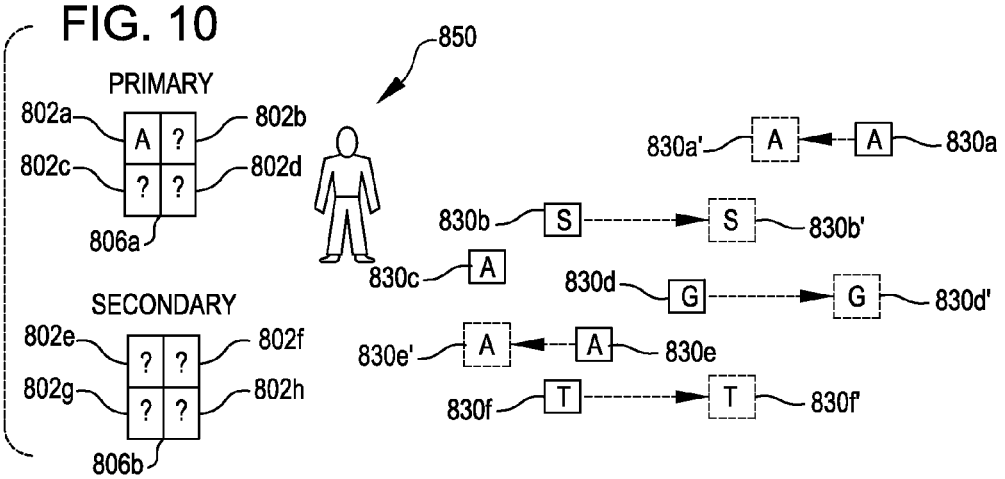
FIG. 10 illustrates an example scenario of determining an allocation of inventory holders to a pick station according to an embodiment.
Figure 11:
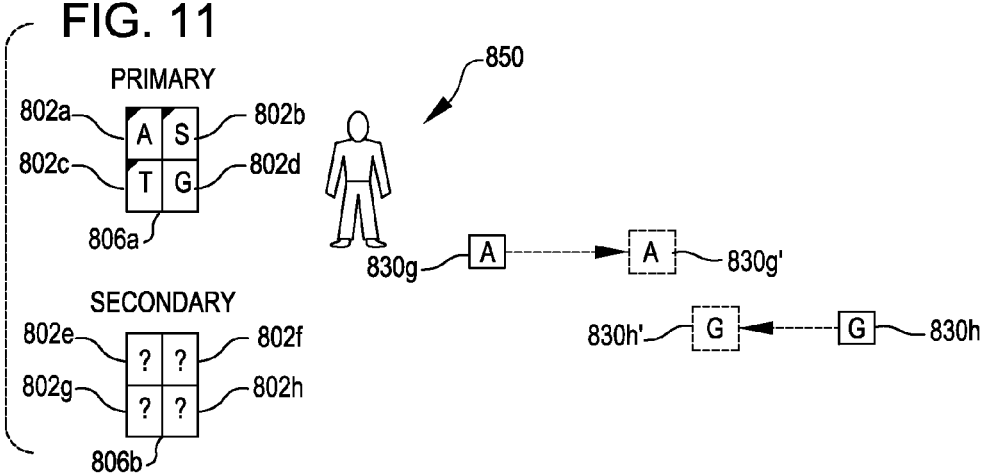
FIG. 11 illustrates a further example scenario of determining an allocation of inventory holders to a pick station according to an embodiment.

FIG. 10 illustrates an example scenario of determining an allocation of inventory holders 830a-f to a pick station 850. A pick station 850 may be associated with a series of requests, in which each request corresponds to a particular inventory item to be transported from a storage location in a particular inventory holder 830 to one of a plurality of other destinations via a container 802. For example, some requests may include retrieving particular inventory items to be transported to an area where customer orders are boxed for shipping, other requests may involve items to be transported to a location for gift-wrapping, and yet other requests may involve items to be transported to another part of a warehouse, another warehouse, or elsewhere. Completing a request may involve selecting and moving a particular inventory holder 830 containing the requested item to the pick station 850 so that the item can be loaded into a container 802. The loaded container 802 may be subsequently routed to the designated destination, for example, by shifting the container 802 from a container holder 806 (such as at 678 in FIG. 8) and onto a conveyer, cart, different container holder, or other mechanism to convey the loaded container 802 to the designated destination or by directly sending a container holder 806 bearing the loaded container 802 (e.g., an O-state container 606 in FIG. 8) to the designated destination. Discussion herein will refer to four such destinations (designated "A", "S", "T", and "G" in FIGS. 10-11); however, embodiments may include any number of destinations. In the example scenario depicted in FIG. 10, each inventory holder 830a-f is designated "A", "S", "T", or "G", according to the designated destination of a requested inventory item stored therein.

Inventory items designated for a shared destination, regardless of whether obtained from different inventory holders 830, may be transported to the shared destination in a common container 802. For example, inventory items designated for the "A" destination (e.g., from inventory holders 830a, 830c, and/or 830e) can be loaded into the common container 802a for transport to the "A" destination. Before any inventory items are placed in a container 802, the container 802 may be an 'uncommitted' container 802 (e.g., containers 802b, 802c, or 802d, designated by a "?" in FIG. 10), equally available to transport inventory items to any of the destinations. However, upon receiving a first inventory item, the container 802 may become designated to the same destination as the received inventory item, thus committing the container 802 to receive only other inventory items designated to the same destination (such as container 802a designated for destination A based on, for example, receiving an inventory item from inventory holder 830c). Accordingly, a sequence in which inventory holders 830 are moved may be organized to favor inventory holders 830 associated with requests for inventory items that are designated for a destination of a committed container 802.

In a non-limiting example illustrated in FIG. 10, all four containers 802a, 802b, 802c, and 802d of a primary container holder 806a located at a pick station 850 are initially uncommitted. All four containers 802e, 802f, 802g, and 802h of a secondary container holder 806b also located at the pick station 850 are also initially uncommitted. Each inventory holder 830a-f available to fulfill a request at the pick station 850 is assigned an initial priority score. The priority score (graphically represented in FIG. 10 as a left-right distance from the pick station 850, with left-most positions corresponding to the highest priority scores) is used to determine which inventory holder 830a-f will be the next to be moved to the pick station 850. As such, an inventory holder 830c having the highest priority score is moved to the pick station 850. An inventory item designated for destination "A" is transferred from the inventory holder 830c to a container 802a, thereby converting the container 802a from an uncommitted state to a state committed to destination "A".

Continuing in this non-limiting example, the priority scores of the remaining inventory holders 830a, 830b, and 830d-f are adjusted to favor filling the committed container 802a over causing an uncommitted container 802b, 802c or 802d to become committed. To this end, the priority scores of the inventory holders 830a and 830e having inventory items also designated for destination "A" are upgraded relative to the priority scores of the inventory holders 830b, 830d, and 830f having inventory items not designated for destination "A". For example, the priority scores of the dissimilar inventory holders 830b, 830d, and 830f may be reduced (graphically represented in FIG. 10 as a rightward shift to the respective score positions 830b', 830d', and 830f') and/or the priority scores of the remaining similar inventory holders 830a and 830e can be increased (graphically represented in FIG. 10 as a leftward shift to the respective score positions 830a' and 830e'). An inventory holder 830e with another inventory item designated for destination "A" (i.e., the same destination as the committed container 802a) is thus the next to be moved to the pick station 850 due to having the highest priority score (i.e., as a result of the upgrade to the increased score position 830e' of the inventory holder 830e and/or the reduced score positions 830b' or 830f' of other inventory holders 830b or 830f).

In some embodiments, priority scores may be adjusted every time an inventory item from an inventory holder 830 is transferred into a container 802. For example, priority scores may be adjusted after each pick operation until a committed container 802 is filled, and a new uncommitted container 802 may become committed based on a highest scoring inventory holder 830 at that point.

In some embodiments, adjusting priority scores may not always result in a sequence of only inventory holders 830 matching a committed container 802. This may be appreciated by continuing with the non-limiting example described above with respect to FIG. 10. As described above, an inventory holder 830c (with an "A" destination item) is moved to the pick station 850 first, causing the container 802 to be committed (also to the "A" destination), and the initial adjustment of priority scores results in another inventory holder 830e (also with an "A" destination item) to be moved to the pick station 850 second. Yet, without further priority score adjustment, the adjusted priority score position of 830a' will still be less than either adjusted priority score position of 830b' or 830f'. Thus, the inventory holders 830b and 830f (respectively with "S" and "T" destination items) will be moved before movement of the inventory holder 830a (with an additional "A" destination item). As a result, in the non-limiting example illustrated in FIG. 10, the container 802b will be committed to the "S" destination (by inventory items from inventory holder 830b) and container 802c will be committed to the "T" destination (by inventory items from inventory holder 830f) before the container 802a committed to the "A" destination receives another inventory item from the inventory holder 830a with the upgraded priority score.

As may thus be appreciated, altering an amount by which priority scores are adjusted may have a corresponding effect on a probability that an inventory holder 830 matching a committed container 802 will proceed next in sequence. An appropriate amount by which to alter priority scores may depend on many factors, including but not limited to, a size or complexity of the inventory system and the combination of other parameters considered in determining the priority score. In some aspects, parameters considered in determining the priority score may include a proximity of an ordered item to a pick station 850 or an urgency with which an ordered item is requested.

FIG. 11 illustrates a further example scenario in determining an allocation of inventory holders 830g and 830h to a pick station 850. In some embodiments, priority scores of inventory holders 830 may be adjusted based on whether committed containers 802 are already full and/or whether moving an inventory holder 830 would involve committing a container 802 of an additional container holder 806. The scenario depicted in FIG. 11 is a continuation of the non-limiting example described above with respect to FIG. 10. Each of the inventory holders 830a-f depicted in FIG. 10 has been ultimately moved to and processed at the pick station 850, causing all of the containers 802a-d of the primary container holder 806a to be committed. Additional inventory holders 830 were moved to and processed at the pick station 850 until containers 802a ("A" destination), 802b ("S" destination), and 802c ("T" destination) are each full (denoted by a marked upper left corner of each container 802a-c in FIG. 11). Container 802d has space to receive one more "G" destination item, and an available inventory holder 830g (with an "A" destination item) has a priority score significantly higher than another available inventory holder 830h (with a "G" destination item"). Based on a determination that the primary container holder 806a lacks acceptable space for an "A" destination item (e.g., that the "A" destination container 802a is full and all other containers 802b-d are otherwise committed), the priority scores of all inventory holders 830 with "A" destination items can be downgraded relative to the priority scores of available inventory holders 830 with non-"A" destination items. For example, the priority score of the inventory holder 830g may be reduced (graphically represented in FIG. 11 as a rightward shift to the score position 830g') and/or the priority score of the inventory holder 830h can be increased (graphically represented in FIG. 11 as a leftward shift to the score position 830h'). However, in a case in which an inventory holder 830g with a downgraded priority score will still be selected (as in FIG. 11), an inventory item from the downgraded inventory holder 830g may be picked for a container 802e on the secondary container holder 806b while the primary container holder 806a may be moved away from the pick station 850 without all containers 802a-d being completely full.

In some embodiments, the discharge container selection module 738 (FIG. 9) for a discharge operation (such as at 678 shown in FIG. 8), selects a particular O-state container holder 606 to be moved to a discharge station. The selection of the particular O-state container holder 606 to be moved may be based on an amount of time that the holder 606 has been in the O-state. The discharge station selected for the particular O-state container holder 606 may be based on a projected time until the discharge operation. However, selection of the particular O-state container and/or discharge station alternatively or additionally can be based on other suitable types of priority analysis. FIG. 12 illustrates an example scenario of determining an allocation of container holders to discharge stations. In the example scenario, a first O-state container holder 906a was loaded at 4:15 pm, while a second O-state container 906b was loaded at 4:18 pm. The first O-state container holder 906a, being older than the second O-state container holder 906b, is selected first for allocation to a discharge station by the discharge container selection module 738. For the first O-state container holder 906, the discharge container selection module 738 evaluates a travel time and a wait time associated with each available discharge station. For example, the discharge container selection module 738 determines that processing at a first discharge station 950a will involve 20 seconds of travel time (e.g., based on a distance from the first O-state container holder 906 to the first discharge station 950a) and zero seconds of wait time (e.g., based on the present queue of zero additional container holders 906 at the first discharge station 950a), while processing at a second discharge station 950b will involve 10 seconds of travel time and 20 seconds of wait time (e.g., based on the two additional container holders 906c, 906d that will still be in the queue after the travel time to the first discharge station 950a). After comparing the net time of 20 seconds associated with the first discharge station 950a against the net time of 30 seconds associated with the second discharge station 950b, the discharge container selection module 738 selects the first discharge station 950a for the first container holder 906a based on the lower net time. In some embodiments, the discharge container selection module 738 may determine allocation of container holders 906 and discharge stations 950 based on other additional or alternative factors, including, but not limited to, whether any station 950 will experience an interruption in operations if a container holder 906 is not sent to the station 950 or an urgency with which inventory items should be discharged, e.g., to fulfill customer orders.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connect" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system comprising:
   a workspace within a facility;
   a plurality of inventory holders configured to store inventory items within the workspace;
   a plurality of container holders configured to move inventory items within the workspace;
   a plurality of containers that are each i) configured to be carried by, and removable from, at least one of the container holders; and ii) configured for receiving one or more inventory items;
   a plurality of stations within the workspace, each station in the plurality of stations configured to receive at least one of an inventory holder or a container holder, each of the plurality of stations configured as one of an induct station, a stow station, a pick station, or a discharge station;
   a plurality of unmanned mobile drive units, at least some of the unmanned mobile drive units configured for moving the inventory holders to and from the stations, and at least some of the unmanned mobile drive units configured for moving the container holders to and from the stations; and
   a management module configured to:
   instruct at least one of the unmanned mobile drive units to move a container holder to the induct station;
   instruct, at the induct station, loading the container holder with a first container containing an inbound inventory item;
   instruct at least one of the unmanned mobile drive units to move the container holder, including the first container, to the pick station;
   instruct, at the pick station, transferring an outbound inventory item from an inventory holder to a second container of the container holder;
   instruct at least one of the unmanned mobile drive units to move the container holder, including the first and second containers, to the discharge station; and
   instruct, at the discharge station, unloading the second container containing the outbound inventory item from the container holder.

2. The inventory system of claim 1, further comprising a mixed storage area within the workspace and configured to store at least some container holders of the plurality of container holders when not received at the stations,
   wherein the management module is further configured to instruct at least one of the unmanned mobile drive units to move the container holder to the mixed storage area when a station is not available for an operation involving the container holder.

3. The inventory system of claim 1, wherein the management module is further configured to:
   instruct at least one of the unmanned mobile drive units to move the container holder with the first container containing the inbound inventory item to the stow station; and
   instruct, at the stow station, transferring the inbound inventory item to an inventory holder from the first container of the container holder.

4. The inventory system of claim 1, wherein the management module is further configured to instruct, at a station, unloading an empty container from the container holder or loading the container holder with an empty container.

5. The inventory system of claim 1, wherein the management module is further configured to instruct, at the discharge station, removing the outbound inventory item from the second container, and leaving the second container empty and loaded on the container holder.

6. The inventory system of claim 1, wherein the management module is further configured to instruct, at the discharge station, removing the second container, including the outbound inventory item, from the container holder, leaving a space unoccupied by a container in the container holder.

7. A method of managing inventory comprising:
   instructing, by a management module, an unmanned mobile drive unit to move a container holder to an induct station of a workspace within a facility, wherein the container holder is configured to removably receive a plurality of containers, each of the plurality of containers configured for receiving one or more inventory items;

instructing, by the management module, loading of the container holder with a first container containing an inbound inventory item at the induct station;

instructing, by the management module, an unmanned mobile drive unit to move the container holder, including the first container, to a pick station of the workspace; and instructing, by the management module, transfer of an outbound inventory item from an inventory holder to a second container of the container holder at the pick station, wherein the inventory holder is configured to store inventory items within the workspace;

wherein the inbound inventory item contained in the first container of the container holder is received into the workspace, and the outbound inventory item contained in the second container of the container holder is designated for transfer out of the workspace.

8. The method of managing inventory of claim 7, further comprising selecting the container holder to be moved to the induct station of the workspace within the facility based at least in part on at least one of a proximity of the selected container holder to the induct station, or a utility of a storage space occupied by the selected container holder.

9. The method of managing inventory of claim 7, further comprising:

instructing, by the management module, an unmanned mobile drive unit to move the container holder, including at least the first container, to a stow station of the workspace; and instructing, by the management module, transfer of the inbound inventory item from the first container of the container holder to an inventory holder at the stow station, wherein the inventory holder is configured to store inventory items within the workspace.

10. The method of managing inventory of claim 9, further comprising selecting the container holder to be moved to the stow station of the workspace within the facility based at least in part on an amount of time elapsed since the selected container holder was loaded with at least the first container including the inbound inventory item.

11. The method of managing inventory of claim 9, further comprising selecting an inventory holder to be moved to the stow station of the workspace within the facility based at least in part on a proximity of the selected inventory holder to the stow station and an amount of space in the selected inventory holder for storing one or more inventory item in at least the first container carried by the container holder.

12. The method of managing inventory of claim 7, further comprising selecting the container holder to be moved to the pick station of the workspace within the facility based at least in part on a proximity of the selected container holder to the pick station.

13. The method of managing inventory of claim 7, further comprising selecting the inventory holder to be moved to the pick station of the workspace within the facility based at least in part on at least one of requests for one or more inventory items stored in the selected inventory holder, a proximity of the selected inventory holder to the pick station, or designated destinations of the one or more inventory items of the selected inventory holder.

14. The method of managing inventory of claim 7, further comprising:

instructing, by the management module, an unmanned mobile drive unit to move the container holder, including at least the second container, to a discharge station of the workspace; and instructing, by the management module, unloading of the second container containing the outbound inventory item from the container holder at the discharge station.

15. The method of managing inventory of claim 14, further comprising selecting the container holder to be moved to the discharge station of the workspace within the facility based at least in part on a proximity of the selected container holder to the discharge station.

16. The method of managing inventory of claim 14, further comprising selecting the container holder to be moved to the discharge station of the workspace within the facility based at least in part on an estimated amount of time until at least the second container including the outbound inventory item will be unloaded from the selected container holder at the discharge station, wherein the estimated amount of time is based at least in part on a travel time of the selected container holder to reach the discharge station and a wait time until the discharge station is available to unload the selected container holder.

17. A non-transitory computer-readable medium having computer-executable instructions stored thereon, wherein the instructions, when executed, cause a computer system having at least one computer processor to perform a method comprising:

instructing an unmanned mobile drive unit to move a container holder to an induct station of a workspace within a facility, wherein the container holder is configured to removably receive a plurality of containers, each of the plurality of containers configured for receiving one or more inventory items;

instructing loading of the container holder with an inbound container containing an inbound inventory item at the induct station;

instructing an unmanned mobile drive unit to move the container holder, including the inbound container, to a pick station of the workspace; and instructing transfer of an outbound inventory item from an inventory holder to an outbound container of the container holder at the pick station, wherein the inventory holder is configured to store inventory items within the workspace.

18. The non-transitory computer-readable medium of claim 17, wherein the method further comprises:

instructing, when a station is not available for an operation involving the container holder, an unmanned mobile drive unit to move the container holder to a mixed storage area configured to store, within the workspace, at least some container holders when not received at stations.

19. The non-transitory computer-readable medium of claim 17, wherein the method further comprises:

instructing an unmanned mobile drive unit to move the container holder, including at least the inbound container containing the inbound inventory item, to a stow station of the workspace;

instructing transfer of the inbound inventory item from the inbound container of the container holder to an inventory holder at the stow station, wherein the inventory holder is configured to store inventory items within the workspace.

20. The non-transitory computer-readable medium of claim 17, wherein the method further comprises:

instructing an unmanned mobile drive unit to move the container holder, including at least the outbound container containing the outbound inventory item, to a discharge station of the workspace;

instructing unloading of the outbound inventory item from the outbound container of the container holder at the discharge station.

\* \* \* \* \*